United States Patent
Taguchi et al.

(10) Patent No.: US 6,858,675 B1
(45) Date of Patent: *Feb. 22, 2005

(54) VIBRATION DAMPING RUBBER MEMBER AND PROCESS OF PRODUCING THE SAME

(75) Inventors: Takehiko Taguchi, Komaki (JP); Ako Yoshikawa, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 566 days.

This patent is subject to a terminal disclaimer.

(21) Appl. No.: 09/868,145

(22) PCT Filed: Oct. 30, 2000

(86) PCT No.: PCT/JP00/07625

§ 371 (c)(1),
(2), (4) Date: Jun. 15, 2001

(87) PCT Pub. No.: WO01/32769

PCT Pub. Date: May 10, 2001

(30) Foreign Application Priority Data

| Nov. 1, 1999 | (JP) | ............................................ 11-311555 |
| Apr. 21, 2000 | (JP) | ....................................... 2000-121142 |
| Jun. 26, 2000 | (JP) | ....................................... 2000-191147 |

(51) Int. Cl.[7] .......................... C08L 21/00; C08L 23/00; C08L 23/04; F16F 1/36; F16F 15/08
(52) U.S. Cl. ....................... 525/191; 525/199; 525/214; 525/218; 525/221; 525/222; 525/232; 525/240; 525/241
(58) Field of Search ................................ 525/191, 199, 525/214, 218, 221, 222, 232, 240, 241

(56) References Cited

U.S. PATENT DOCUMENTS 6,043,308 A    3/2000   Tanahashi et al.

6,465,607 B2 * 10/2002 Taguchi et al. ............. 528/480

FOREIGN PATENT DOCUMENTS

| JP | 2-308841 | 12/1990 |
| JP | 5-44776 | 2/1993 |
| JP | 6-65422 | 3/1994 |
| JP | 9-302154 | 11/1997 |
| JP | 11-349737 | 12/1999 |
| JP | 2000-198974 | 7/2000 |
| WO | WO97/03122 | 1/1997 |

OTHER PUBLICATIONS

U.S. Appl. No. 09/870,054, filed May 30, 2001, Taguchi et al.

* cited by examiner

Primary Examiner—Nathan M. Nutter
(74) Attorney, Agent, or Firm—Burr & Brown

(57) ABSTRACT

A process of producing a vibration damping rubber member, wherein a rubber material A which enables the vibration damping rubber member to have a low degree of dynamic spring stiffness, a rubber material B which enables the vibration damping rubber member to have a high vibration damping effect, and a vulcanizing agent capable of vulcanizing only an unvulcanized mass of the rubber material B are evenly mixed together and heated to vulcanize the rubber material B dispersed as the fine particles in the rubber material A. A vulcanizing agent capable of vulcanizing the rubber material A is added, and a thus obtained mixture is formed into a desired shape and heated to vulcanize the rubber material A so that the formed vibration damping rubber member has an island-sea structure in which fine particles of the vulcanized rubber material B are dispersed as a dispersed phase in a matrix phase of the vulcanized rubber material A.

7 Claims, 3 Drawing Sheets

VIBRATION DAMPING RUBBER MEMBER AND PROCESS OF PRODUCING THE SAME

FIELD OF THE INVENTION

The present invention relates to a vibration damping rubber member and a process of producing the same, and more particularly to a vibration damping rubber member capable of exhibiting low dynamic stiffness and high vibration damping effect, and a process suitable for producing such a vibration damping rubber member. The present invention is also concerned with a process of producing a vibration damping rubber member having an increased vibration damping effect, so as to reduce its dynamic/static ratio of spring constant for thereby reducing the dynamic stiffness.

DISCUSSION OF THE RELATED ART

As well known, a vibration damping rubber member interposed between two members in a vibration transmitting system so as to connect the two members in a vibration damping fashion has been widely used in various fields. For instance, the vibration damping rubber member is used on automotive vehicles, as engine mounts, body mounts, member mounts, suspension bushings, and so on.

A vibration damping rubber member used in a vibration transmitting system involving different kinds of vibrations having different frequencies, for instance, typically, the vibration damping rubber member as used on the automotive vehicles as described above, is generally required to exhibit vibration damping characteristics suitable to effectively damp those different kinds of vibrations. Described in detail, the vibration damping rubber member used on the automotive vehicles is generally required to exhibit a relatively low degree of dynamic spring stiffness with respect to input vibrations having comparatively high frequencies of 100 Hz or higher, and to exhibit a relatively high damping effect with respect to input vibrations having comparatively low frequencies of about 10–20 Hz. In the present invention, the dynamic spring stiffness is defined by a dynamic/static ratio ($Kd_{100}/Ks$) of spring constant of the vibration damping rubber member, which is a ratio of a dynamic spring constant $Kd_{100}$ to a static spring constant Ks of the vibration damping rubber member. The dynamic spring constant Kd100 is obtained when it is subjected to vibration of 100 Hz. The dynamic spring stiffness decreases with a decrease of the dynamic/static ratio $Kd_{100}/Ks$. On the other hand, the damping effect is defined by a loss factor (tan δ) of the vibration damping rubber member when it is subjected to vibration of 15 Hz. The damping effect increases with an increase of the loss factor tan δ.

For producing vibration damping rubbers structure having improved vibration damping characteristics as represented by a reduced degree of dynamic spring stiffness and an increased damping effect, various studies have been made to improve the material of the vibration damping rubber member and the process of preparing a composition of the material. For example, there has been proposed to use natural rubbers (NR) which are suitable for reducing the dynamic spring stiffness of the vibration damping rubber members, and add a carbon black to the natural rubbers, to increase the damping effect of the vibration damping rubber members. However, the known vibration damping rubber members according to those studies are by no means sufficiently satisfactory in terms of the required vibration damping characteristics.

Described more specifically, the mechanism by which the dynamic spring stiffness of a vibration damping rubber member is reduced is based on bonding, binding or linking among the molecules of polymers of the rubber composition, or bonding and binding between the polymer molecules and reinforcing additives contained in the rubber composition. On the other hand, the mechanism by which the vibration damping effect is increased is based on a friction among the polymer molecules or among the polymer molecules and the reinforcing additives. Therefore, there are problems that increasing the vibration damping effect of the vibration damping rubber member will cause an increase of the dynamic spring stiffness, while reducing the dynamic spring stiffness will cause a decrease of the vibration damping effect. There has not been available a rubber composition which exhibits a sufficiently low degree of dynamic spring stiffness and a sufficiently high vibration damping effect, which are two distinct characteristics not compatible with each other.

In the meantime, there have been proposed fluid-filled vibration damping rubber members, as improvements in the construction rather than the material. Generally, such fluid-filled vibration damping rubber members use an elastic body formed of a rubber composition in which a plurality of fluid chambers are formed in fluid communication with each other through orifice passages (restricted fluid passages). These fluid-filled vibration damping rubber members are arranged to exhibit desired vibration damping characteristics depending upon respective frequency bands of the input vibrations; on the basis of resonance of a fluid flowing through the orifice passages. Accordingly, those fluid-filled vibration damping rubber members are inevitably complicated in construction, with a relatively large number of components, and suffer from potential problems of a relatively high cost and considerable difficulty of manufacture.

The vibration damping rubber members are required to have a relatively high degree of hardness, in view of their applications in which the rubbers should withstand a relatively large load, for instance. This requirement is conventionally satisfied by using a rubber composition which contains a diene-based rubber material such as a natural rubber (NR), and additives such as a carbon black. The addition of such additives including the carbon black makes it possible to increase the hardness and the vibration damping effect of the vibration damping rubber member, but inevitably results in an undesirable increase in the dynamic spring stiffness. Various other approaches for improving the rubber composition have been proposed to obtain a vibration damping rubber member capable of exhibiting the desired characteristics, namely, low dynamic spring stiffness and high damping effect. For instance, the damping effect is increased by adding a suitable rubber material to the natural rubber (NR). However, the reduction of the dynamic/static ratio of spring constant of the vibration damping rubber members according to such approaches is not still satisfactory.

SUMMARY OF THE INVENTION

The present invention was made in view of the background art described above. It is a first object of this invention to provide a vibration damping rubber member which is capable of exhibiting both a low degree of dynamic spring stiffness and a high vibration damping effect and which can be economically and easily produced, and a process suitable for producing such a vibration damping rubber member.

The first object indicated above may be achieve according to the present invention, which provides a vibration damping rubber member having an island-sea structure in which fine particles of a vulcanized rubber material B which enables the vibration damping rubber member to have a high vibration damping effect are dispersed as a dispersed phase in a matrix phase of a vulcanized rubber material A that enables the vibration damping rubber member to exhibit a low degree of dynamic spring stiffness, the vibration damping rubber member being characterized in that the vulcanized rubber material B functioning as the dispersed phase is formed by vulcanizing an unvulcanized mass of the rubber material B while the unvulcanized mass of the rubber material B is evenly mixed with and dispersed in an unvulcanized mass of the rubber material A, and the unvulcanized mass of the rubber material A is vulcanized while the vulcanized rubber material B is dispersed in the unvulcanized mass of the rubber material A.

The vibration damping rubber member constructed according to the present invention has an island-sea structure constituted by the matrix phase consisting of the vulcanized rubber material A which enables the damping rubber member to exhibit a low degree of dynamic spring stiffness, and the dispersed phase consisting of the vulcanized rubber material B which enables the damping rubber member to have a high vibration damping effect. The present vibration damping rubber member is primarily characterized by this island-sea structure which is formed as described above. In the island-sea structure, the vulcanized rubber material A functioning as the matrix phase permits a significant reduction in the dynamic spring stiffness of the damping rubber member, while the vulcanized rubber material B evenly dispersed as fine particles in the matrix phase of the vulcanized rubber material A assures a high vibration damping effect of the damping rubber member.

In essence, the vulcanized rubber material A and the vulcanized rubber material B in the present vibration damping rubber member can effectively function, independently of each other, to reduce the dynamic spring stiffness and to increase the vibration damping effect, respectively, and at the same time, unlike the conventional rubber composition.

Accordingly, the present vibration damping rubber member can be suitably used as vibration damping rubber structures for automotive vehicles, and other damping rubber structures in a vibration transmitting system involving different kinds of vibrations having different frequencies, and is capable of effectively damping such vibrations.

In addition, the present vibration damping rubber member does not require such a complicated construction as provided in a fluid-filled vibration damping structure, and can therefore be produced economically and comparatively easily.

According to one preferred form of the vibration damping rubber member of the invention, the vulcanized rubber material B consists of fine particles which have an average size of 0.1–100 μm and which are dispersed in the vulcanized rubber material A. In this case, the vibration damping characteristics are further improved (the dynamic spring stiffness is further reduced, and the vibration damping effect is further increased), and the vibration damping rubber member is given the desired physical properties.

According to another preferred form of the vibration damping rubber member of the invention, the rubber material A consists of NR, or a mixture of NR and BR or SBR, and the rubber material B consists of halogenated IIR, maleicacid-modified EPM, CR, carboxyl-modified NBR, CSM, CPE, FR or acrylic rubber. In this form of the invention, the vibration damping rubber member exhibits further improved vibration damping characteristics.

The present invention also provides a vibration damping rubber member having an island-sea structure in which fine particles of a vulcanized rubber material B which enables the vibration damping rubber member to have a high vibration damping effect are dispersed as a dispersed phase in a matrix phase of a vulcanized rubber material A that enables the vibration damping rubber member to exhibit a low degree of dynamic spring stiffness, characterized in that the rubber material A is a natural rubber, while the rubber material B is an acrylic rubber, and the rubber materials A and B are mixed together in a proportion of 90/10–60/40 by weight, and that the vulcanized rubber material B functioning as the dispersed phase is formed as fine particles having a size of 0.1–100 μm, by vulcanizing an unvulcanized mass of the rubber material B while the unvulcanized mass of the rubber material B is evenly mixed with and dispersed in an unvulcanized mass of the rubber material A, and the unvulcanized mass of the rubber material A is vulcanized while the vulcanized rubber material B is dispersed in the unvulcanized mass of the rubber material A.

In this vibration damping rubber member according to the present invention, a suitable amount of the vulcanized acrylic rubber which enables the damping rubber member to have a high vibration damping effect is dispersed as a disperse phase in the form of fine particles having a size of 0.1–100 μm, in a matrix phase of the natural rubber which enables the damping rubber member to exhibit a low degree of dynamic spring stiffness. Accordingly, the present vibration damping rubber structure is capable of exhibiting excellent vibration damping characteristics (low dynamic spring stiffness and high vibration damping effect). Further, the disperse phase consisting of the acrylic rubber effectively functions to distribute or reduce the load which acts on the damping rubber, so that the durability of the damping rubber member is accordingly increased.

The present invention further provides a process of producing a vibration damping rubber member, characterized by: evenly mixing together an unvulcanized rubber material A which enables the vibration damping rubber member to exhibit a low degree of dynamic spring stiffness, an unvulcanized rubber material B which enables the vibration damping rubber member to have a high vibration damping effect, and a vulcanizing agent capable of vulcanizing only the unvulcanized rubber material B; heating a mixture of the unvulcanized rubber materials A and B and the vulcanizing agent, to vulcanize the unvulcanized rubber material B such that fine particles of the vulcanized rubber material B are dispersed in the unvulcanized rubber material A; adding to the mixture a vulcanizing agent capable of vulcanizing the unvulcanized rubber material A; and forming a thus obtained mixture into a desired shape, and heating the formed mixture to vulcanize the unvulcanized rubber material A, for obtaining the vibration damping rubber member having an island-sea structure in which fine particles of the vulcanized rubber material B are dispersed as a dispersed phase in a matrix phase of the vulcanized rubber material A.

This process according to the present invention permits advantageous formation of the island-sea structure in which fine particles of the vulcanized rubber material B which enables the damping rubber member to have a high vibration damping effect are evenly dispersed as a dispersed phase in a matrix phase (sea phase) of the vulcanized rubber material A which enables the damping rubber member to exhibit a low degree of dynamic spring stiffness. Thus, the vibration damping rubber member capable of exhibiting both low dynamic spring stiffness and high vibration damping effect can be advantageously produced.

The present method makes it possible to comparatively easily and economically produce the vibration damping rubber member having excellent damping characteristics as described above.

In one preferred form of the process of the present invention, the unvulcanized rubber material A is evenly mixed with the rubber material B to which the vulcanizing agent capable of vulcanizing only the unvulcanized rubber material has been mixed with the unvulcanized rubber material. In this instance, the time required to mix the rubber material A, the rubber material B and the vulcanizing agent capable of vulcanizing only the rubber material B can be effectively shortened, and the rubber material B and the vulcanizing agent can be more evenly or uniformly dispersed within the rubber material A, so that the vibration damping effect of the damping rubber member can be further effectively increased.

In another preferred form of the process of the invention, wherein the unvulcanized rubber material A is vulcanized by a sulfur-based vulcanizing system, while the unvulcanized rubber material B is vulcanized by a resin-based vulcanizing system, a metal-oxide-based vulcanizing system or an amine-based vulcanizing system. In this process, the rubber materials A and B are vulcanized by the respective different vulcanizing systems, making it possible to permit the produced damping rubber member to have the island-sea structure which exhibits further improved vibration damping characteristics.

The present inventors considered the application of the above-indicated island-sea structure to a vibration damping rubber member which is formed of a diene-based rubber composition such as an NR-based rubber composition and which has a loss factor tan δ of at least 0.1. The loss factor represents the damping effect with respect input vibrations having low frequencies (e.g., 15 Hz). The inventors found that the use of a rubber material of functional group-vulcanization type as the dispersed phase of the island-sea structure makes it possible to obtain a vibration damping rubber member whose dynamic/static ratio of spring constant is considerably lower than that of the vibration damping rubber member formed solely of the vulcanized diene-based rubber composition.

Accordingly, the present invention which was made also on the basis of the above-indicating finding has a second object of reducing the dynamic/static ratio of spring constant of a vibration damping rubber member which has a high vibration damping effect as represented by a loss factor tan δ of at least 0.1, in particular, providing a process suitable for producing a vibration damping rubber member capable of exhibiting both a high vibration damping effect and a low degree of dynamic spring stiffness.

The second object indicated above may also be achieved according to the present invention, which provides a process of producing a vibration damping rubber member having a desired shape, and a low degree of dynamic/static ratio of spring constant and a high vibration damping effect, by vulcanizing and forming a rubber composition which includes a diene-based rubber material as a rubber component and which enables the vulcanized and formed rubber composition to have a loss factor tan δ of at least 0.1, characterized in that a portion of the diene-based rubber material is replaced by not greater than 40% by weight of a rubber material of functional group-vulcanization type per 100% by weight of a total amount of these two rubber materials, and the two rubber materials and a vulcanizing agent capable of vulcanizing only the rubber material of functional group-vulcanization type are evenly mixed together to form a mixture, which is heated to vulcanize the rubber material of functional group-vulcanization type such that fine particles of the vulcanized rubber material of functional group-vulcanization type are dispersed in the diene-based rubber material, and wherein a vulcanizing agent capable of vulcanizing the diene-based rubber material A is added to the mixture, and a thus obtained mixture is formed into a desired shape and heated to vulcanize the diene-based rubber material A, for obtaining the vibration damping rubber member such that the vibration damping rubber member has an islands-sea structure in which fine particles of the rubber material of functional group-vulcanization type are dispersed as a dispersed phase in a matrix phase of the diene-based rubber material and which has the low degree of dynamic/static ratio of spring constant.

In the present process of the invention of producing a vibration damping rubber member using a diene-based rubber material which has a loss factor tan δ of at least 0.1, a portion of the diene-based rubber material is replaced by not greater than 40% by weight of the rubber material of functional group-vulcanization type per 100% by weight of a total amount of these two rubber materials, so that the vulcanized rubber material of functional group-vulcanization type constitutes the dispersed phase of the island-sea structure. In the present process, this island-sea structure is formed as described above. The dynamic/static ratio of spring constant of the vibration damping rubber member produced according to this process is considerably lower than that of a vibration damping rubber member formed solely of the dine-based rubber material, with respect to input vibrations having relatively high frequencies.

According to the present process of the invention of producing a vibration damping rubber member having low dynamic/static ratio of spring constant and high damping effect, the produced damping rubber member is given the island-sea structure, so that the vibration damping characteristics of the damping rubber member are considerably improved (with reduced dynamic spring stiffness and increased vibration damping effect) than those of a vibration damping rubber structure formed of an intimate mixture of two rubber materials which respectively give desired different characteristics. The island-sea structure is further effective to improve the other physical properties required by the vibration damping rubber member. Thus, the present process permits advantageous manufacture of a vibration damping rubber member capable of exhibiting a significantly reduced dynamic/static ratio of spring constant and a high vibration damping effect, as well as assuring various physical properties required by the vibration damping rubber member.

According to one preferred form of the present process, the rubber material of functional group-vulcanization type is halogenated IIR. The use of the halogenated IIR further improves the vibration damping characteristics of the damping rubber member, that is, further reduced dynamic spring stiffness and further increased vibration damping effect.

According to another preferred form of the present process, the vulcanized rubber material of functional group-vulcanization type is dispersed in the form of fine particles having an average size of 0.1–100 μm in the vulcanized diene-based rubber material. In this case, the vibration damping characteristics and other required physical properties of the damping rubber member are further improved.

DETAILED DESCRIPTION OF THE INVENTION

Figure 1:
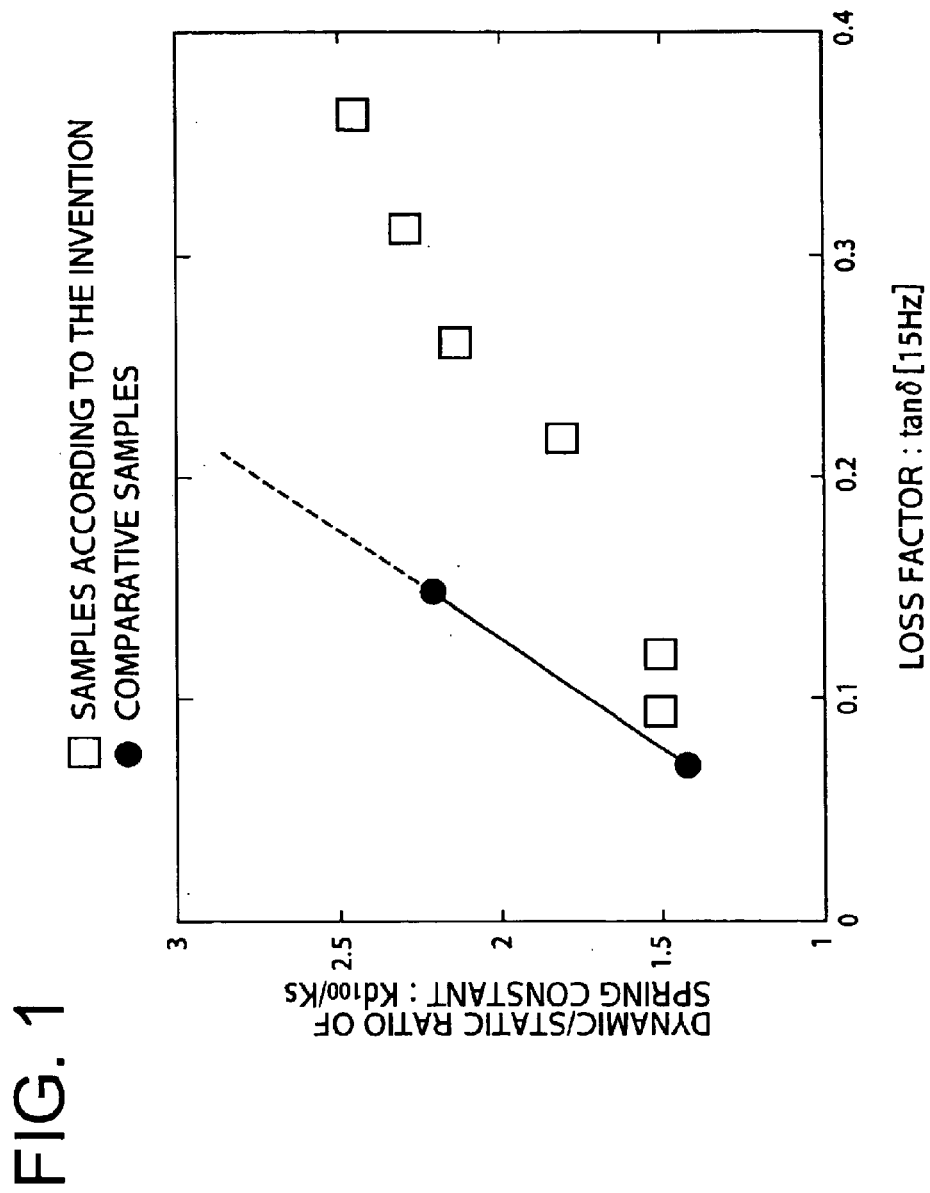
FIG. 1 is a graph indicating a relationship between a dynamic/static ratio of spring constant and a loss factor, which relationship was obtained in Example 1.

The vibration damping rubber member according to the present invention as described above is formed using a rubber composition consisting of a rubber material A for reducing the dynamic spring stiffness of the damping rubber and a rubber composition B for increasing the damping effect. Described in detail, an unvulcanized mass of the rubber material A and an unvulcanized mass of the rubber material B are initially uniformly kneaded or mixed together, such that the unvulcanized rubber material B is dispersed in the form of fine particles in the unvulcanized rubber material A. Then, the rubber material B is vulcanized, and the rubber material A is subsequently vulcanized, so that the vibration damping rubber member consisting of the vulcanized rubber materials A and B is formed. This is a major feature of the present invention.

Namely, the vibration damping rubber member produced by the process of the present invention having the above-described feature is not a structure formed of an intimate mixture of the vulcanized rubber materials A and B, but is a so-called "island-sea" structure in which fine particles of the vulcanized rubber material B are highly uniformly or evenly dispersed as a dispersed or discontinuous phase in a matrix phase of the vulcanized rubber material A. In this island-sea structure, the matrix phase of the vulcanized rubber material A assures a sufficiently low degree of dynamic spring stiffness of the damping rubber member, while the dispersed phase of the vulcanized rubber material B assures a sufficiently high vibration damping effect of the damping rubber member.

In essence, the vulcanized rubber material A and the vulcanized rubber material B of the vibration damping rubber member according to this invention have respective distinct functions of improving the dynamic spring stiffness characteristic and the vibration damping characteristic, and are capable of achieving these two functions with high efficiency. In other words, the use of the vulcanized rubber materials A and B advantageously permits reduction of the dynamic spring stiffness and increase of the vibration damping effect, which have been incompatible with each other.

The rubber material A used as the matrix phase for the vibration damping rubber member according to the present invention may be selected as needed, depending upon the desired characteristics of the damping rubber member, from among various known kinds of rubber material that permits effective reduction of the dynamic spring stiffness with respect to vibrations of relatively high frequencies in particular, after vulcanization of the rubber material. For instance, the rubber material A may be selected from diene-based rubber materials such as natural rubber (NR), isoprene rubber (IR), butadiene rubber (BR), stylene butadiene rubber (SBR) and acrylonitrile butadiene rubber (NBR). Preferably, the rubber material A is selected according to the present invention, from among rubber materials (hereinafter referred to as "NR-based materials") which include NR as an essential component, for example, from among NR, mixtures of NR and BR, and mixtures of NR and SBR, in order to assure efficient reduction of the dynamic spring stiffness of the vibration damping rubber member.

On the other hand, the rubber material B used as the dispersed phase is required to exhibit a high vibration damping effect with respect to vibrations of relatively low frequencies in particular, after vulcanization of the rubber material, and is further required to be vulcanized with a vulcanizing system that is different to that of the rubber material A. Accordingly, the rubber material B is selected as needed, depending upon the desired characteristics of the damping rubber member, from among various rubber materials which are known to be effective to improve the vibration damping characteristic and which satisfies the above-indicated requirement regarding the vulcanizing system. Where the rubber material A is selected from among the NR-based rubber materials as described above, for instance, the rubber material B are particularly preferably selected from among: chlorinated butyl rubbers such as halogenated butyl rubber (halogenated IIR); maleicacid-modified ethylene propylene rubber (maleicacid-modified EPM); chloroprene rubber (CR); carboxyl-modified nitrile rubber (carboxyl-modified NBR); chlorosulfonated polyethylene (CSM); fluororubber (FR); chlorinated polyethylene (CPE); and acrylic rubber. The rubber materials B indicated above by way of example are all effective to reduce the dynamic spring stiffness after the vulcanization, and can be vulcanized with a vulcanizing system different from that of the NR-based rubber materials, as described below. Further, those rubber materials B permit effective improvements of various characteristics of the vibration damping structure, such as gas permeability resistance, weather resistance, heat resistance, ozone resistance, chemical resistance, and durability, as indicated in the following Table 1. Even where those rubber materials B have a structure in which cross linking of functional groups takes place, such rubber materials B are recognized as rubber materials of functional group-vulcanization type.

TABLE 1

| Rubber Material B | Given Characteristics |
| --- | --- |
| Halogenated IIR | Gas permeability resistance |
| Maleicacid-modified EPM | Resistances to weather, heat and ozone |
| CR | Resistances to heat, oil, ozone and gas permeability |
| Carboxyl-modified NBR | Resistances to oil, gas permeability, heat and ozone |
| CSM | Resistances to weather, ozone, chemicals, heat and gas permeability, and durability |
| FR | Resistances to heat, oil, chemicals, gas permeability, and durability |
| Acrylic rubber | Resistances to weather, heat, oil, ozone and gas permeability, and durability |
| CPE | Durability and ozone resistance |

Acrylic rubber used as the rubber material A may be selected as needed, depending upon the desired characteristics of the damping rubber member, from among any known synthetic rubber materials whose major component is acrylic acid alkyl ester. In particular, it is preferable to use acrylic rubber materials which can be vulcanized with an amine-based vulcanizing system which will be described. For instance, it is preferable to use a copolymer (ACM) of acrylic acid alkyl ester and 2-chloroethyl vinyl ether, a copolymer (ANM) of acrylic acid alkyl ester and acrylonitrile, and a copolymer of acrylic acid alkyl ester and ethylene. The use of such acrylic rubber materials advantageously permits an increase of the durability of the vibration damping rubber member.

The process of producing a vibration damping rubber member having a low dynamic/static ratio of spring constant and a high vibration damping effect according to the present invention is applied to a rubber composition whose major component is a diene-based rubber material (rubber material A), which is a rubber composition that gives a vulcanized rubber mass having a loss factor tan δ of at least 0.1. The use of the rubber material A that gives a vulcanized rubber mass having a loss factor tan δ of less than 0.1 does not reduce the dynamic/static ratio of spring constant of the produced damping rubber member to the desired extent, even if the produced damping rubber member has an "island-sea" structure. To assure the desired characteristics of the produced damping rubber member, it is desirable that the vulcanized rubber mass indicated above have a JIS-A hardness value of at least A40, preferably, at least A50. If the hardness of the vulcanized rubber mass obtained from the rubber material A is considerably low, the produced vibration damping rubber member cannot satisfy the requirement of its applicability.

The contents of appropriate known additives selected as needed, such as an oil as well as a carbon black generally added as a reinforcing agent are suitably determined so as to prepare the desired rubber composition that realizes the desired characteristics (tan $\delta \geq 0.1$) of the produced damping rubber member.

In the present invention, the vibration damping rubber member having the intended island-sea structure is produced using the unvulcanized rubber materials A and B which have been described above. To this end, the unvulcanized rubber material A and the unvulcanized rubber material B are uniformly kneaded under heat, together with a vulcanizing agent (hereinafter referred to as "vulcanizing agent B") which does not vulcanize the rubber material A but promotes the vulcanization of only the rubber material B. In this manner, the rubber material B can be vulcanized without the vulcanization of the rubber material A, while fine particles of the unvulcanized rubber material B are evenly dispersed in the unvulcanized rubber material A.

The vulcanizing agent B used for vulcanizing the rubber material B is required to vulcanize only the rubber material B while holding the rubber material A in the unvulcanized state. Accordingly, the vulcanizing agent B is selected as needed, depending upon the specific rubber materials A and B, from among various known vulcanizing agents that satisfy the above-indicated requirement. Described in detail, where the rubber material A is the NR-based material, the vulcanizing agent B is preferably selected, depending upon the specific rubber material B, from among the following materials indicated in the following TABLE 2, which do not vulcanize the NR-based rubber material A: resins such as alkyl phenol resin and modified alkylphenol resin; metal oxides such as zinc oxide and magnesium oxide; and polyamines such as hexamethylenediamine carbamate. The rubber material B is preferably vulcanized with a resin-based vulcanizing system, a metal-oxide-based vulcanizing system or an amine-based vulcanizing system, which includes any one of those preferred vulcanizing agents B. It is noted that TABLE 2 lists the preferred vulcanizing agents B suitable for use with halogenated IIR, maleicacid-modified EPM, CR, carboxyl-modified NBR, CSM, FR, CPE and acrylic rubbers, which are preferably used as the rubber material A, as described above.

TABLE 2

| Rubber Material B | Vulcanizing System | Vulcanizing Agent B | Vulcanization Promoting Agent/Aid |
|---|---|---|---|
| Halogenated IR | Resin | Alkyl phenol | 4,4'-dithiodimorpholine Tellurium diethyldithio carbamate |
|  | Resin | Modifed alkylphenol resin | Zinc oxide |
|  | Metal oxide | Zinc oxide | Zinc diethyldithio-carbamate |
| Maleicacid-modified EPM | Metal oxide | Zinc oxide |  |
| CR | Metal oxide | Zinc oxide Magnesium oxide | 2-mercaptoimidazoline |
| Carboxyl-modified NBR | Metal oxide | Zinc oxide |  |
| CSM | Metal oxide | Magnesium oxide | Pentaerythritol Dipentamethylene thiuram tetrasulfide |
| FR | Metal oxide | Magnesium oxide | Calcium hydroxide |
| Acrylic rubber | Amine | Hexamethylene diamine carbamate | Diorthotolyl guanidine |
| CPE | Metal oxide | Magnesium oxide | Hexamethylene dicarbamate |

In the present invention, the rubber material B may be vulcanized with a vulcanizing system consisting of the vulcanizing agent B and at least one selected vulcanization promoting agent and/or aid which does not vulcanize the rubber material A. The appropriate vulcanization promoting agent(s) and/or aid(s) is/are selected depending upon the specific rubber material B and the specific vulcanizing agent B, as indicated in TABLE 2. The unvulcanized rubber materials A and B are kneaded together with the vulcanizing agent B and the selected at least one vulcanization promoting agent and/or aid, so that the rubber material B is vulcanized with an improved result. Any other suitable additives known in the art for rubber compositions may be added to the unvulcanized rubber materials A and B to provide a mixture thereof by kneading, provided those additives do not vulcanize the rubber material A.

To promote the vulcanizing reaction of the rubber material B while the unvulcanized rubber materials A and B are evenly kneaded under heat, together with the vulcanizing agent B and other additives, the suitable amounts of the unvulcanized rubber materials A and B, the vulcanizing agent B and the selected additive(s) are introduced into a suitable known kneader or mixer such as banbury mixer which permits kneading or mixing of polymer materials under an ordinary heating condition. The amounts of the unvulcanized rubber materials A and B to be introduced into the kneader are determined so that the vibration damping rubber member to be formed as the end product can exhibit the desired operating characteristics or physical properties. Generally, the ratio of the weight of the unvulcanized rubber material A to that of the unvulcanized rubber material B is selected within a range between 95/5 and 30/70. If the amount of the unvulcanized rubber material B is excessively smaller than that of the unvulcanized rubber material B, the desired vibration damping effect of the produced damping rubber member cannot be obtained owing to the vulcanized rubber material B. If the amount of the unvulcanized rubber material B is excessively larger than that of the unvulcanized rubber material A, on the other hand, the physical properties such as the tensile property and hardness of the vibration damping rubber member may be deteriorated. To assure the desired physical properties of the damping rubber member by preventing a risk of deterioration of the physical properties where the amount of the rubber material B is larger than that of the rubber material A, the ratio of the weight of the rubber material A to that of the rubber material B is preferably selected within a range between 95/5 and 50/50. Where the acrylic rubber is used as the rubber material B, however, the above-indicated ratio by weight of the rubber materials A and B is desirable selected within a range between 90/10 and 60/40. When the amount of the acrylic rubber used is smaller than the lower limit determined by the lower limit of this ratio by weight, the acrylic rubber does not permit sufficient improvements in the vibration damping effect and durability of the produced damping rubber member. When the amount of the acrylic rubber used is larger than the upper limit determined by the upper limit of the ratio by weight, on the other hand, the acrylic rubber may cause deterioration of the other physical properties, such as an increase in the permanent compressive strain.

In the process of this invention of producing the vibration damping rubber member having a low dynamic/static ratio of spring constant and a high vibration damping effect, the maximum amount of the rubber material B is 40% by weight of the total amount of the rubber materials A and B. If the amount of the rubber material B is more than 40% by weight, the dynamic/static ratio of spring constant of the produced vibration damping rubber member cannot be made sufficiently low, and there is a risk of deterioration of the physical properties of the damping rubber member, such as insufficient hardness and considerable reduction of the tensile property, although the damping rubber member exhibits a sufficiently high vibration damping effect.

The amounts of the vulcanizing agent B and the vulcanization promoting agent(s) and/or aid(s) which are introduced into the kneader together with the unvulcanized rubber materials A and B are suitably determined depending upon the amount of the unvulcanized rubber material B, in order to permit the desired vulcanizing reaction of the rubber material B.

The unvulcanized rubber materials A and B, the vulcanizing agent B and the appropriate additive or additives may be simultaneously introduced into the kneader or mixer, without any problem. However, it is desirable to prepare a mixture of the unvulcanized rubber material B, vulcanizing agent B and additive or additives, with a suitable proportion, in the form of a master batch, for example. In this case, the prepared mixture and the rubber material A are introduced into the kneader, so as to establish the desired ratio by weight of the unvulcanized rubber materials A and B. This method is effective to shorten the time required for kneading or mixing the materials within the kneader, and permit improved uniformity or evenness of dispersion of the rubber material B, vulcanizing agent B and additive(s) in the rubber material A, thereby assuring a considerable increase in the vibration damping effect of the damping rubber member owing to the vulcanized rubber material B.

The materials which have been introduced into the kneader as described above are subsequently kneaded so that the rubber material B is divided into fine particles small enough to assure the desired characteristics of the produced damping rubber member, and until the fine particles are dispersed in the rubber material A evenly enough to assure the desired characteristics. To this end, the kneading time is generally determined as needed, in view of the specific kinds and the amounts of the rubber materials A and B and the operating characteristics of the kneader, in order to establish the desired state of dispersion of the fine particles of the rubber material B. The materials are kneaded at a temperature that facilitates the kneading operation and permits a high degree of vulcanizing reaction of the unvulcanized rubber material B.

As a result of the kneading operation under heat, the vulcanized rubber material B is evenly dispersed in the form of fine particles in the unvulcanized rubber material A. The particle size of the vulcanized rubber material B is determined as needed, depending upon the specific conditions of kneading as described above, in order to assure the desired vibration damping effect. The average particle size of the vulcanized rubber material B is selected generally within a range of 0.1–100 $\mu$m, and preferably within a range of 0.1–30 $\mu$m. If the average particle size is excessively small, the produced vibration damping rubber member does not exhibit the desired damping effect. If the average particle size is excessively large, the physical properties of the produced vibration damping rubber member are adversely influenced. The particle size of the vulcanized rubber material B may be measured by various known methods. Preferably, the particles of the vulcanized rubber material B are observed by a scanning electron microscope (SEM) or a scanning probe microscope (SPM), to measure the sizes of the particles and determine the average particle size.

After the vulcanization of the unvulcanized rubber material B as described above, a vulcanizing agent (hereinafter referred to as "vulcanizing agent A") capable of vulcanizing the unvulcanized rubber material A within which the vulcanized rubber material B is dispersed is added to the rubber material A, to vulcanize the unvulcanized rubber material A into the desired vibration damping rubber member.

In the production of the vibration damping rubber member according to the present invention, the vulcanizing agent A to be added to vulcanize the unvulcanized rubber material A may be selected from among various know vulcanizing agents, depending upon the specific rubber material A and the desired characteristics of the produced rubber member, provided the vulcanizing agent A permits effective promotion of the vulcanizing reaction of the rubber material A. The amount of the vulcanizing agent A is suitably determined depending upon the amount of the rubber material A used. Where the rubber material A is an NR-based rubber material as described above, a sulfur-based vulcanizing agent containing sulfur is preferably used as the vulcanizing agent A for vulcanizing the rubber material A.

In the present process, suitable vulcanization promoting agents and/or aids may be used with the vulcanizing agent A, to prepare a vulcanizing system for vulcanizing the rubber material A. Typical examples of the vulcanization promoting agents include: sulfenamides such as N-tert-butyl-2-benzothiazolylsulfenamide (BBS), N-cyclohexyl-2-benzothiazolylsulfenamide (CBS), and N-oxydiethylene-2-benzothiazolylsulfenamide (OBS); dithiocarbamates such as zinc dimethyldithiocarbamate (ZnMD C), and zinc diethyldithiocarbamate (ZnEDC); and thiurams such as tetramethyl thiuram disulfide (TMTD), tetraethyl thiuram disulfide (TETD), and tetrabutyl thiuram disulfide (TBTD). Typical vulcanization promoting aids include zinc oxide and stearic acid.

Various other suitable additives used for rubber materials may be added to the unvulcanized rubber material A, as needed. Those additives may include: reinforcing agents such as carbon black; products of reaction between acetone and diphenylamine; phenylenediamines such as N-phenyl-N'-isopropyl-p-phenylenediamine; anti-aging agents such as wax; and softening agents such as process oil and mineral oil. Needless to say, these additives should not prevent the produced damping rubber member from exhibiting the desired property of low dynamic spring stiffness, and the amounts of the additives should be determined so as not to deteriorate this property. For instance, the use of carbon black in an excessively large amount will have a considerable influence on the dynamic spring stiffness of the rubber material A. In this respect, the carbon black is preferably used in an amount of not larger than 60 parts by weight per 100 parts by weight of the rubber material A.

To mix the vulcanizing agent A and the various additives indicated above with the rubber material A within which the vulcanized rubber material B is dispersed, the vulcanizing agent A and the additives are added to the rubber material A, and these components are evenly kneaded or mixed together by a suitable kneader or mixer, for instance, by a mixer of roll type, so that the unvulcanized rubber material A can be uniformly vulcanized in a desired manner, in a vulcanizing step following the addition of the vulcanizing agent A and additives. The kneading or mixing length of time and the temperature condition in which the kneading is effect are suitably selected.

After the vulcanizing agent A and additives are added to the rubber material A, the obtained rubber composition is formed into the desired vibration damping rubber member, with the unvulcanized rubber material A being vulcanized, as indicated above. To this end, the rubber composition is formed into a desired shape, by a suitable molding method using a molding die, for instance, at the suitably determined temperature at which the unvulcanized rubber material A is vulcanized. It is preferable to form the damping rubber member, by a press-molding and -vulcanizing process in which the molding and the vulcanization are effected concurrently. The vulcanizing conditions such as the temperature, pressure and time may be determined as needed, depending upon the specific kinds of the rubber material A, vulcanizing agent A and additives, so as to vulcanize the rubber material A as desired. The vibration damping rubber member to be produced as a result of the molding and vulcanization of the rubber material A as described above may be provided with a metallic structure made of a ferrous or aluminum material, which may be bonded to the rubber member during or after the molding and vulcanizing operation. In this respect, it is to be understood that the process of the present invention is applicable to not only a vibration damping rubber member without such a metallic structure, but also a vibration damping rubber member with such a metallic structure bonded thereto. It is also to be understood that the configuration and size of the damping rubber member to be produced by vulcanizing the rubber material A are not particularly limited, but may be determined as needed, depending upon the desired characteristics and application of the damping rubber member.

In essence, the vibration damping rubber member to be produced according to the present invention has an "island-sea" structure in which in which fine particles (generally of a size within a range of 0.1–100 $\mu$m) of the vulcanized rubber material B are evenly dispersed as a dispersed or discontinuous phase in a matrix or continuous phase of the vulcanized rubber material A. This island-sea structure permits the damping rubber member to exhibit both of a sufficiently low degree of dynamic spring stiffness and a sufficiently high vibration damping effect. In other words, the process of the present invention permits easy and economical production of a comparatively simple vibration damping rubber member, using the selected rubber materials A and B, so as to enable the vibration damping rubber member to exhibit improved vibration damping characteristics, that is, low dynamic spring stiffness and high vibration damping effect.

Thus, the process of the present invention can be advantageously used to form the vibration damping rubber member highly capable of dealing with different kinds of input vibrations having different frequency bands, by suitably selecting the rubber composition including the rubber materials A and B, depending upon the frequency bands of the input vibrations, so that the selected rubber composition permits the produced vibration damping rubber member to exhibit low dynamic spring stiffness and high damping effect with respect to the specific kinds of input vibrations to be damped. The thus produced vibration damping rubber member can be suitably used so as to exhibit excellent vibration damping characteristics, in a vibration transmitting system as in an automotive vehicle, which involves different kinds of vibrations to be damped.

EXAMPLES

Several examples of the present invention will be described to further clarify the present invention. It is to be understood that the present invention is by no means limited to these examples, and that the invention may be embodied with various changes, modifications and improvements, other than the following examples and the details of the foregoing descriptions, which may occur to those skilled in the art, without departing from the spirit of this invention.

Example 1

(1) Dynamic Characteristics Test, Tensile Test and Hardness Test

Initially, an unvulcanized natural rubber (NR) was prepared according to the present invention, as the rubber material A which enables the produced vibration damping rubber member to exhibit a sufficiently low degree of dynamic spring stiffness, and there was prepared also according to the present invention a master batch of a composition indicated in TABLE 3 below, which includes a mixture of unvulcanized chlorinated butyl rubber (Cl-IIR) as the rubber material B which enables the produced vibration damping rubber member to exhibit a sufficiently high vibration damping effect, and zinc oxide as the vulcanizing agent B. The master batch further includes zinc diethyldithiocarbamate (ZnEDC) as the vulcanization promoting agent, and stearic acid as the vulcanization promoting aid.

TABLE 3

| Composition | Contents (by weight) |
| --- | --- |
| Chlorinated IIR | 100 |
| Zinc oxide | 1.5 |
| ZnEDC | 1.5 |
| Stearic acid | 1 |

Precursors of Samples 1–6 according to the present invention were prepared from respective combinations of the NR and master batch composition prepared as described above, which combinations have respective proportions of mixing or blending (by weight) of the NR and Cl-IIR (blending ratios of NR/Cl-IIR) as indicated in TABLE 4 below. The individual combinations were introduced into a kneader called "banbury mixer", and were evenly kneaded or mixed together for 5–10 minutes at a temperature of 150–160° C., so that only the rubber material B in the form of Cl-IIR was vulcanized, without vulcanization of the NR. For each precursor of Samples 1–7, the sizes of particles of Cl-IIR dispersed within the mass of the NR were measured to obtain the average particle size of Cl-IIR. The obtained average particle size of Cl-IIR in the precursor of each sample was confirmed to be about 0.5–5 μm.

To 100 parts by weight of the unvulcanized NR in the precursor of each Sample, there were added sulfur as the vulcanizing agent A and various additives indicated in TABLE 4, in respective amounts indicated in TABLE 4. These components were evenly kneaded with a mixer of roll type, and the obtained mixtures were subjected to a press-molding and -vulcanizing process for 20 minutes at 160° C., to prepare vulcanized rubber members as test pieces of Samples 1–6 according to the present invention, for performing a dynamic characteristics test, a tensile test and a hardness test.

Of the additives to be added to the NR as indicated in TABLE 4, N-cyclohexyl-2-benzothiazyl sulfenamide (CBS) was used as the vulcanization promoting agent, while zinc oxide and stearic acid were used as the vulcanization promoting aids. In the present Example 1, N-phenyl-N'-isopropyl-p-phenylenediamine was used as the anti-aging agent, and carbon black was used as the reinforcing agent, while mineral oil was used as the softening agent.

The test pieces to be used for the dynamic characteristics test are cylindrical pieces formed of the vulcanized rubber and having a diameter of 50 mm and a height dimension of 25 mm. To the upper and lower faces of these cylindrical test pieces, there are bonded with a bonding agent a pair of circular iron plates having a diameter of 60 mm and a thickness of 6 mm. The test pieces to be used for the tensile test are dumb-bell-shaped test pieces (No. 3 type) formed of the vulcanized rubber according to JIS-K-6251-1993, "Tensile Test Method of Vulcanized Rubber". The test pieces to be used for the hardness test are plates formed of the vulcanized rubber having a thickness of 2 mm according to JIS-K-6253-1997, "durometer hardness test" described in "Physical Test Method of Vulcanized Rubber".

TABLE 4

| | Samples of the Invention | | | | | |
|---|---|---|---|---|---|---|
| | 1 | 2 | 3 | 4 | 5 | 6 |
| NR/Cl-IIR Ratio | 90/10 | 85/15 | 70/30 | 50/50 | 40/60 | 30/70 |
| Vulcanizing Agent A and Additives (parts by weight)* | | | | | | |
| Sulfur | 2 | 2 | 2 | 2 | 2 | 2 |
| CBS | 1 | 1 | 1 | 1 | 1 | 1 |
| Zinc oxide | 5 | 5 | 5 | 5 | 5 | 5 |
| Stearic acid | 2 | 2 | 2 | 2 | 2 | 2 |
| Anti-aging agent | 5 | 5 | 5 | 5 | 5 | 5 |
| Carbon black | 40 | 40 | 40 | 40 | 40 | 40 |
| Mineral oil | 10 | 10 | 10 | 10 | 10 | 10 |

*Parts by weight per 100 parts by weight of NR

On the other hand, test pieces according to Comparative Samples 1 and 2, which are similar to the test pieces according to Samples 1–6 of the present invention, were prepared for the dynamic characteristics test, tensile test and hardness test, by molding and vulcanizing respective rubber compositions indicated in TABLE 5, for 20 minutes at a temperature of 160° C., by a press-molding and -vulcanizing process. These rubber compositions include only the unvulcanized NR as the rubber material.

The functions of the additives to be added to the NR in the Comparative Samples are the same as those in Samples 1–6 of the present invention described above. In Comparative Sample 2, the carbon black is used in a comparatively large amount, and therefore also functions to improve the vibration damping effect, as in the known damping rubber members.

TABLE 5

| | Comparative Samples | |
|---|---|---|
| | 1 | 2 |
| Components (parts by weight) | | |
| NR | 100 | 100 |
| Sulfur | 2 | 2 |
| CBS | 1 | 1 |
| Zinc oxide | 5 | 5 |
| Stearic acid | 2 | 2 |
| Anti-aging agent | 5 | 5 |
| Carbon black | 40 | 85 |
| Mineral oil | 10 | 10 |

The test pieces according to Samples 1–6 of the present invention and the test pieces according to Comparative Samples 1 and 2, which were prepared as described above, were subjected to the dynamic characteristics test, tensile test and hardness test in the following manners.

Dynamic Characteristics Test

An axial load was applied to each test piece until the test piece was compressed by an axial distance of 5.5 mm. After the load was once reduced, the load was increased to compress the test piece again by the axial distance of 5.5 mm. During this second load application, a change of the amount of compressive strain of each test piece with an increase of the load was measured, to obtain a load-strain curve. Load values $P_1$ and $P_2$ (unit: N) when the amount of compressive strain was 1.25 mm and 3.75 mm were obtained from the obtained load-strain curve. A static spring constant Ks (N/mm) of each test piece was calculated according to the following equation:

$$Ks=(P_2-P_1)/2.5$$

Further, each test piece was compressed by an axial distance of 2.5 mm. In this compressed state, the test piece was subjected at its lower end to harmonic compressive vibration having a frequency of 100 Hz such that the amplitude of the vibratile displacement at the middle of the axial length of the 2.5 mm-compressed test piece was held constant at ±0.05 mm. A dynamic spring constant (storage spring constant) $Kd_{100}$ (N/mm) of the test piece subjected to the 100 Hz vibration was obtained according to JIS-K-6385-1995, (a) non-resonance method described in "Test Method of Vibration Damping Rubber". On the basis of the thus obtained dynamic spring constant $Kd_{100}$ and the static spring constant Ks indicated above, a dynamic/static ratio ($Kd_{100}$/Ks) of spring constant of each test piece was calculated. The calculated dynamic/static ratio values of the test pieces are indicated in TABLE 6 and TABLE 7. It is noted that the dynamic spring stiffness of the test piece when it is subjected to the 100 Hz vibration decreases with a decrease of the dynamic/static ratio (Kd100/Ks) of spring constant.

In the dynamic characteristics test in Example 1, each test piece was again compressed by an axial distance of 2.5 mm. In this compressed state, the test piece was subjected at its lower end to harmonic compressive vibration having a frequency of 15 Hz such that the amplitude of the vibratile displacement at the middle of the axial length of the 2.5 mm-compressed test piece was held constant at ±0.5 mm. A loss factor tan δ of the test piece subjected to the 15 Hz vibration was obtained according to JIS-K-6385-1995, (a) non-resonance method described in "Test Method of Vibration Damping Rubber". The obtained values of the loss factor tan δ are also indicated in TABLE 6 and TABLE 7. It is noted that the vibration damping effect of the test piece increases when it is subjected to the 15 Hz vibration with an increase of the loss factor.

A relationship between the dynamic/static ratio $Kd_{100}/Ks$ and the loss factor tan δ[15 Hz] of each test piece is indicated in the graph of FIG. 1. In the graph, "□" represents the test pieces according to Samples 1–6 of the present invention, while "●" represents the test pieces according to Comparative Samples 1 and 2.

Tensile Test

Figure 2:
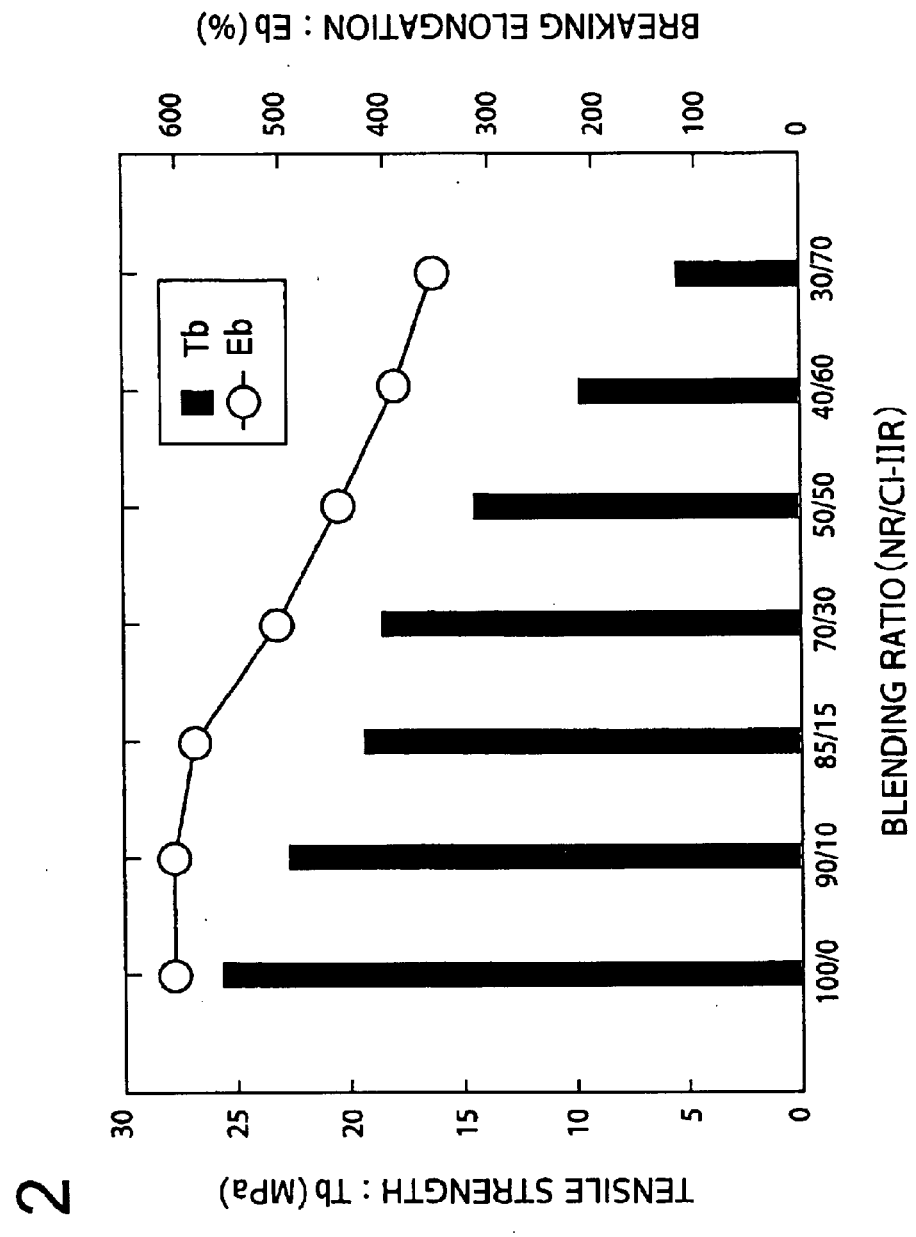
FIG. 2 is a graph indicating a tensile strength and a breaking elongation at different values of blending ratio of natural rubber and chlorinated butyl rubber, which were obtained in Example 1.

The test pieces for the tensile test were subjected to a tensile load with a tensile tester, according to JIS-K-6251-1993, until each test piece was broken or fractured. In this process of application of the tensile load to the test piece, there were measured a tensile stress (100% modulus) when the test piece had 100% elongation, a maximum tensile stress (tensile strength Tb) when the test piece was broken, and an amount of elongation (breaking elongation Eb) when the test piece was broken. The measurements are indicated in TABLE 6 and TABLE 7. The tensile strength Tb and the breaking elongation Eb of the test pieces according to Samples 1–6 of this invention are indicated in respective bar and line graphs of FIG. 2, in relation to the ratio of blending of the NR and Cl-IIR indicated in TABLE 4. The tensile strength Tb and the breaking elongation Eb of the test piece according to Comparative Sample 1 is indicated in the graphs of FIG. 2, at the position of the blending ratio of 100/0.

Hardness Test

The hardness of each test piece for the hardness test was measured by a type-A durometer, according to JIS-KK-6253-1997, "durometer hardness test" described above. The measurements are indicated in TABLE 6 and TABLE 7, as JIS-A Hardness.

TABLE 6

| | Samples of the Invention | | | | | |
|---|---|---|---|---|---|---|
| | 1 | 2 | 3 | 4 | 5 | 6 |
| Dynamic Characteristics Test | | | | | | |
| Dynamic/static ratio ($Kd_{100}/Ks$) | 1.51 | 1.51 | 1.81 | 2.15 | 2.30 | 2.45 |
| Loss factor tanδ [15 Hz] | 0.094 | 0.120 | 0.217 | 0.260 | 0.310 | 0.362 |
| Tensile Test | | | | | | |
| 100% modulus (Mpa) | 1.4 | 1.4 | 1.3 | 1.4 | 1.3 | 1.3 |
| Tensile strength Tb (Mpa) | 22.6 | 19.3 | 18.6 | 14.6 | 10.0 | 5.6 |
| Breaking elongation Eb (%) | 600 | 580 | 500 | 440 | 390 | 350 |
| JIS-A Hardness | A48 | A47 | A48 | A47 | A47 | A47 |

TABLE 7

| | Comparative Samples | |
|---|---|---|
| | 1 | 2 |
| Dynamic Characteristics Test | | |
| Dynamic/static ratio $Kd_{100}/Ks$ | 1.51 | 1.51 |
| Loss factor tan δ [15 Hz] | 0.094 | 0.120 |
| Tensile Test | | |
| 100% modulus (Mpa) | 1.4 | 1.4 |
| Tensile strength Tb (Mpa) | 22.6 | 19.3 |
| Breaking elongation Eb (%) | 600 | 580 |
| JIS-A Hardness | A48 | A47 |

It will be understood from TABLES 6 and 7 and FIG. 1 that the test piece according to Comparative Sample 1 using only the NR as the rubber material has a low degree of dynamic spring stiffness (low dynamic/static ratio of spring constant), but also has a low vibration damping effect (low loss factor), while the test piece according to Comparative Sample 2 formed of the composition including a larger amount of carbon black mixed with the NR than the test piece according to Comparative Sample 1 has a higher vibration damping effect that the test piece according to Comparative Sample 1, but has a considerably high degree of dynamic spring stiffness, as indicated in the graph of FIG. 1. Accordingly, it will be easily predicted that the use of carbon black in a much larger amount than in Comparative Sample 2 in an attempt to further increase the vibration damping effect, as in the prior art, does not realize a sufficiently low degree of dynamic spring stiffness, as is apparent from broken line in FIG. 1. Therefore, such prior art method cannot be said to be effective.

To the contrary, it is recognized that each of the test pieces according to Samples 1–6 of the present invention permits an effective increase in the vibration damping effect (loss factor), while maintaining a low degree of dynamic spring stiffness (dynamic/static ratio of spring constant), unlike the test piece according to Comparative Sample 2. It will therefore be understood that the present invention is significantly effective to realize the desired vibration damping characteristics, namely, both of a low degree of dynamic spring constant and a high vibration damping effect.

It will also be understood from the results of the tensile and hardness tests indicated in TABLES 6 and 7 and in FIG. 2 that most of the test pieces according to Samples 1–6 of the present invention exhibit tensile and hardness characteristics such as the 100% modulus, tensile strength Tb and breaking elongation Eb, which are comparable with those of the test pieces according to Comparative Samples 1 and 2. In particular, it will be understood from the graphs in FIG. 2 that the physical properties such as the tensile strength Tb and breaking elongation Eb can be maintained at sufficiently high values, provided the amount of the Cl-IIR used as the rubber material B is smaller than that of the NR used as the rubber material A.

(2) Durability Test

As in the tests described above, an unvulcanized natural rubber (NR) was prepared as the rubber material A which enables the produced vibration damping rubber member to exhibit a sufficiently low degree of dynamic spring stiffness, and there was prepared a master batch (hereinafter referred to as "master batch AEM) of a composition indicated in TABLE 8 below, which includes a mixture of unvulcanized acrylic rubber (AEM: VAMAC-G available from Mitsui Dupont Polychemical Kabushiki Kaisha) as the rubber material B which enables the produced vibration damping rubber member to exhibit a sufficiently high vibration damping effect, and hexamethylenediamine carbamate as the vulcanizing agent B. The master batch AEM further includes diorthotolyl guanidine (DT) as the vulcanization promoting agent, and stearic acid as the vulcanization promoting aid.

TABLE 8

| Composition | Contents (by weight) |
|---|---|
| Acrylic rubber | 100 |
| Hexamethylenediamine carbamate | 2 |
| DT | 5 |
| Stearic acid | 2 |

Precursors of Samples 7–9 according to the present invention and a precursor of Comparative Sample 4 were prepared from respective combinations of the NR and master batch AEM prepared as described above, which combinations have respective proportions of mixing or blending (by weight) of the NR and AEM (blending ratios of NR/AEM) as indicated in TABLE 9 below. The individual combinations were introduced into a kneader called "banbury mixer", and were evenly kneaded or mixed together for 5–10 minutes at a temperature of 150–160° C., so that only the acrylic rubber was vulcanized, without vulcanization of the NR.

To the precursors of Samples 7–9 of the invention and the precursors of Comparative Samples 3 and 4 (Comparative Sample 3 prepared from only the unvulcanized NR), there were added sulfur and various additives indicated in TABLE 9, in respective amounts indicated in TABLE 9. The additives consist of zinc oxide plus stearic acid, HAF carbon black (ASTM-N330), and a softening agent in the form of an aromatic process oil. All components indicated above were evenly kneaded with a mixer of roll type, and the obtained mixtures were subjected to a press-molding and -vulcanizing process, to prepare vulcanized rubber members as test pieces of Samples 7–9 according to the present invention and Comparative Samples 3 and 4, for performing a durability test and a permanent compressive strain test. The vulcanization was effected for 20 minutes at a temperature of 160° C. for the test pieces to be used for the durability test, and for 30 minutes at 160° C. for the test pieces to be used for the permanent compressive strain test. For each of the test pieces according to Samples 7–9 of the invention, the sizes of particles of the acrylic rubber dispersed within the mass of the NR were measured to obtain the average particle size of the acrylic rubber. The obtained average particle size of the acrylic rubber in each test piece was confirmed to be about 0.5–3 μm.

The test pieces to be used for the durability test are dumb-bell-shaped test pieces (No. 5 type) formed according to JIS-K-6251-1993, "Tensile Test Method of Vulcanized Rubber". The test pieces to be used for the permanent compressive strain test are large pieces according to JIS-K-6262-1997, "Permanent Strain Test Method of Vulcanized Rubber and Thermoplastic Rubber".

TABLE 9

| | Samples of the Invention | | | Comparative Samples | |
|---|---|---|---|---|---|
| | 7 | 8 | 9 | 3 | 4 |
| Components (parts by weight) | | | | | |
| NR | 60 | 80 | 90 | 100 | 50 |
| Master Batch AEM | 43.6 | 21.8 | 10.9 | — | 54.5 |
| Carbon Black | 25 | 25 | 25 | 25 | 25 |
| Softening Agent | 5 | 5 | 5 | 5 | 5 |
| Sulfur | 1 | 1 | 1 | 1 | 1 |
| CBS | 2 | 2 | 2 | 2 | 2 |
| Zinc oxide + Stearic Acid | 5 | 5 | 5 | 5 | 5 |

The test pieces according to Samples 7–9 of the invention and Comparative Samples 3–4, which were prepared as described above, were subjected to the durability test and the permanent compressive strain test in the following manners:

Durability Test

Each of the test pieces for the durability test was repeatedly subjected to a tensile load by a suitable tensile tester, so as to cause the test piece to undergo a tensile strain of 0–100% 300 times per minute, until the test piece was broken or fractured. The number of times of the tensile strain until the test piece was broken was obtained. The obtained numbers of times are indicated in TABLE 10, as the value indicative of the durability (dumb-bell fatigue) of the test pieces.

Permanent Compressive Strain Test

Each of the test pieces for the permanent compressive strain test was held compressed at a predetermined compression ratio, and at 100° C. for 22 hours, with a suitable compressing device, by a method according to JIS-K-6262-1997, "5. Permanent Compressive Strain Test". Then, the compressive load was removed from each test piece, and the test piece was held at the room temperature for a predetermined cooling time. Then, the thickness of a central portion of each test piece was measured to obtain the permanent compressive strain percentage. The obtained permanent compressive strain percentage values of the test pieces are indicated in TABLE 10.

TABLE 10

| | Samples of the Invention | | | Comparative Samples | |
|---|---|---|---|---|---|
| | 7 | 8 | 9 | 3 | 4 |
| Durability: Dumb-bell Fatigue (× 10K) | 10 | 7.0 | 6.5 | 5.0 | 12 |
| Permanent Compressive Strain (%) | 38 | 34 | 33 | 33 | 48 |

It will be apparent from the test result indicated in TABLE 10 that each of the test pieces according to Samples 7–9 of the invention, which were prepared from the natural rubber as the rubber material A for reducing the dynamic spring stiffness, and the acrylic rubber as the rubber material B for increasing the vibration damping effect, has a significantly higher degree of durability than the test piece according to Comparative Sample 4 prepared from only the NR. The test piece according to Comparative Sample 4 was prepared using the acrylic rubber as the rubber material B for increasing the vibration damping effect, but the content of the acrylic rubber is smaller than required by the present invention, so that the permanent compressive strain percentage of this test piece is higher than desired, although the durability of the test piece is improved. While the vibration damping rubber member is required to exhibit a low permanent compressive strain percentage, this physical property is deteriorated according to Comparative Sample 4.

Example 2

In this Example, an unvulcanized natural rubber (NR) or an unvulcanized stylene butadiene rubber (SBR) was prepared as the rubber material A, while various mater batches were prepared as the rubber material B, by using unvulcanized respective masses of fluororubber (FR), chloroprene rubber (CR), chlorosulfonated polyethylene (CSM), maleicacid-modified nitrile rubber (X-NBR), copolymer (AEM) of acrylic acid alkyl ester and ethylene, and chlorinated polyethylene (CPE), in combination of selected additives in respective proportions as indicated in TABLES 11 and 12.

TABLE 11

| | | | | Unit: Parts by weight | |
|---|---|---|---|---|---|
| FR Master Batch | | CR Master Batch | | CSM Master Batch | |
| FR | 100 | CR | 100 | CSM | 100 |
| MgO | 3 | MgO | 4 | MgO | 5 |
| CaO | 6 | ZnO | 5 | Cross-linking aid[2] | 3 |
| | | Stearic acid | 1 | Vulcanization promoting agent[3] | 2 |
| | | Vulcanization promoting agent[1] | 0.5 | | |

[1] 2-mercaptoimidazoline
[2] Pentaerythritol
[3] Dipentamethylene thiuram tetrasulfide

TABLE 12

| | | | | Unit: Parts by weight | |
|---|---|---|---|---|---|
| X-NBR Master Batch | | AEM Master Batch | | CPE Master Batch | |
| X-NBR | 100 | AEM | 100 | CPE | 100 |
| Stearic acid | 1 | Stearic acid | 2 | MgO | 10 |
| ZnO | 1.5 | Cross-linking agent[4] | 2 | Plasticizer[6] | 10 |
| Vulcanization promoting agent[3] | 1.5 | Vulcanization promoting agent[5] | 5 | Cross-linking agent[4] | 3 |

[3] See TABLE 11.
[4] Hexamethylenediamine carbamate
[5] Diorthotolyl guanidine
[6] Dioctyl phthalate Precursors of Samples 10–17 according to the present invention and Comparative Samples 5–7 were prepared from respective combinations of the rubber material A and the master batch composition including the rubber material B, which combinations have respective proportions of mixing or blending (by weight) of the rubber materials A and B as indicated in TABLES 13 and 14 below. The individual combinations were evenly kneaded or mixed together for 5–10 minutes at a temperature of 150–160° C., so that only the rubber material B was vulcanized, without vulcanization of the rubber material A. For the precursor of each of Samples 10–17, the sizes of particles of the rubber material B dispersed within the rubber material A were measured to obtain the average particle size of the rubber material B. The obtained average particle size of the rubber material B in the precursor of each sample was confirmed to be about 0.5–5 μm.

In each preliminary sample thus prepared, the unvulcanized rubber material A was vulcanized. Described in detail, 100 parts by weight of the unvulcanized rubber material A in each of the Comparative Sample 5 and the Samples 10–14 of the invention was mixed with 2 parts by weight of sulfur as the vulcanizing agent A, 5 parts by weight of processing aid, and 1 part by weight of sulfenamide-based vulcanization promoting agent. These components were evenly kneaded, and the obtained mixtures were subjected to a press-molding and -vulcanizing process for 20 minutes at 160° C., as in Example 1, to prepare test pieces of Comparative Sample 5 and Samples 10–14 of the invention. For Comparative Samples 6 and 7 and Samples 15–17 of the invention, 100 parts by weight of the unvulcanized rubber material A was mixed with 3 parts by weight of sulfur as the vulcanizing agent A, 5 parts by weight of processing aid, 25 parts by weight of HAF carbon black (ASTMN330), 10 parts by weight of softening agent (aromatic process oil), and 1 part by weight of sulfenamide-based vulcanization promoting agent. These components were evenly kneaded, and the rubber material A in each of the obtained mixtures was subjected to a press-molding and -vulcanizing process for 20 minutes at 160° C., to prepare test pieces of Comparative Samples 6 and 7 and Samples 15–17 of the invention.

The thus obtained test pieces according to Comparative Samples and Samples of the invention were tested by the same methods as in Example 1, to measure their tensile strength (Tb), breaking elongation (Eb) and JIS-A hardness, and also an amount of change (ΔTb) of the tensile strength and an amount of change (ΔEb) of the breaking elongation after a thermal aging test of the test pieces (at 80° C. for 250 hours). Further, the test pieces were subjected to the dumbbell fatigue test, in the same manner as in Example 1. The results of the tests of the test pieces are indicated in TABLES 13 and 14. The test pieces were further measured of their resistances to ozone and gas permeability. The measurements are also indicated in TABLES 13 and 14.

The resistance to ozone was evaluated by static ozone-deterioration test according to JIS-K-6301-1995. Described in detail, JIS No. 1 test pieces were held elongated by 20% and exposed to an atmosphere having an ozone concentration of 50±5 pphm at 40° C., for 168 hours. The ozone resistance was evaluated depending upon whether each test piece was fractured or broken during its elongation and exposure to the atmosphere indicated above. The resistance to gas permeability was evaluated by a method according to ASTM-D-1434-82. Namely, each test piece in the form of a 2 mm-thick sheet was exposed to a pressure difference on its opposite sides at a temperature of 60° C. such that a pressure of 100 Kpa of $N_2$ gas on one side (high-pressure side) of the sheet while 1330 Pa acts on the other side (low-pressure side). The gas permeability resistance was evaluated on the basis of a rate (cc·cm/cm$^2$·sec·atm) at which the $N_2$ gas permeates through the sheet from the high-pressure side to the low-pressure side.

TABLE 13

| | Comparative | Samples of the Invention | | | | |
|---|---|---|---|---|---|---|
| | Sample 5 | 10 | 11 | 12 | 13 | 14 |
| Polymer | NR | NR/FR | NR/CR | NR/CSM | NR/X-NBR | NR/AEM |
| Mixing Ratio | 100 | 70/30 | 70/30 | 70/30 | 70/30 | 30/70 |

TABLE 13-continued

| | Comparative Sample 5 | Samples of the Invention | | | | |
|---|---|---|---|---|---|---|
| | | 10 | 11 | 12 | 13 | 14 |
| Tb (MPa) | 23 | 19 | 22 | 23 | 12 | 23 |
| Eb (%) | 690 | 860 | 840 | 680 | 720 | 740 |
| JIS-A Hardness After Thermal Aging: | A40 | A38 | A38 | A42 | A41 | A43 |
| ΔTb (%) | −22 | −34 | −31 | −21 | −12 | −16 |
| ΔEb (%) | −11 | −30 | −56 | −13 | −6 | −4 |
| Durabllity: Dumb-bell fatigue (×10K) | 6 | 16 | — | 17 | 3 | 30 |
| Gas permeability (×10$^{-9}$) (cc · cm/ cm$^2$ · sec) | 2.65 | 2.34 | 2.00 | 1.92 | 2.00 | 2.30 |
| Ozone deterioration hours | 72H | — | 120H | — | 144H | Not Broken |

TABLE 14

| | Comparative Samples | | Samples of the Invention | | |
|---|---|---|---|---|---|
| | 6 | 7 | 15 | 16 | 17 |
| Polymer | NR | SBR | NR/CPE | SBR/CSM | SBR/CPE |
| Mixing Ratio | 100 | 100 | 65/35 | 65/35 | 65/35 |
| Tb (MPa) | 25 | 19 | 17 | 12 | 17 |
| Eb (%) | 630 | 670 | 670 | 270 | 590 |
| JIS-A Hardness After Thermal Aging: | A50 | A53 | A58 | A65 | A65 |
| ΔTb (%) | −41 | −48 | −55 | 0 | −8 |
| ΔEb (%) | −24 | −54 | −52 | −26 | −32 |
| Durability: Dumb-bell fatigue (×10K) | 9 | 28 | 18 | 2 | 30 |
| Ozone deterioration hours | 14H | 72H | Not Broken | 96H | 144H |

It will be understood from the results of the tests indicated in TABLES 13 and 14 that the vulcanized rubber members according to Samples 10–17 of the present invention prepared from the combinations of the polymers mixed together are excellent in the following characteristics, respectively:

Sample 10: Durability

Sample 11: Durability, and ozone resistance

Sample 12: Heat resistance, durability, gas permeability resistance, and ozone resistance Sample 13: Heat resistance, gas permeability resistance, and ozone resistance Sample 14: Heat resistance, durability, and ozone resistance Sample 15: Durability, and ozone resistance Sample 16: Heat resistance, and ozone resistance Sample 17: Heat resistance, durability, and ozone resistance Example 3

Precursors of Comparative Sample 11 and Samples 18 and 19 of the present invention were prepared from respective combinations of unvulcanized natural rubber (NR) and/or unvulcanized stylene butadiene rubber (SBR) as the rubber material A, and master batch Cl-IIR prepared in Example 1. The individual combinations have respective proportions of mixing or blending (by weight) of the NR, SBR and Cl-IIR as indicated in TABLE 15 below. The components of each combination were introduced into a kneader called "banbury mixer", and were evenly kneaded or mixed together for 5–10 minutes at a temperature of 150–160° C., so that only the rubber material B in the form of Cl-IIR was vulcanized, without vulcanization of the rubber material A. For each precursor of Samples 1–7, the sizes of particles of Cl-IIR dispersed within the mass of the rubber material A were measured to obtain the average particle size of Cl-IIR. The obtained average particle size of Cl-IIR in the precursor of each sample was confirmed to be about 0.5–5 μm.

To 100 parts by weight of the unvulcanized rubber material A in the precursor of each Sample, there were added sulfur as the vulcanizing agent A and various additives indicated in TABLE 15, in respective amounts indicated in TABLE 15. These components were evenly kneaded with a mixer of roll type, and the obtained mixtures were subjected to a press-molding and -vulcanizing process for 20 minutes at 160° C., to prepare test pieces of Samples 18 and 19 of the present invention and Comparative Sample 11, for performing a dynamic characteristics test, a hardness test and a tensile test.

Of the additives to be added to the rubber material A as indicated in TABLE 15, N-cyclohexyl-2-benzothiazyl sulfenamide (CBS) was used as the vulcanization promoting agent, while zinc oxide and stearic acid were used as the vulcanization promoting aids. In the present Example 3, wax was used as the anti-aging agent, and carbon black was used as the rubber characteristic adjusting agent (reinforcing agent), while an oil was used as the softening agent.

TABLE 15

| | Samples of the Invention | | Comparative Samples | | | |
|---|---|---|---|---|---|---|
| | 18 | 19 | 8 | 9 | 10 | 11 |
| NR | 85 | 55 | 100 | 60 | 100 | 85 |
| SBR | — | 35 | — | 40 | — | — |
| Master batch Cl-IIR | 15 | 10 | — | — | — | 15 |
| Sulfur | 2 | 2 | 2 | 2 | 2 | 2 |
| Stearic acid | 5 | 5 | 5 | 5 | 5 | 5 |
| Zinc oxide | 2 | 2 | 2 | 2 | 2 | 2 |
| Wax | 2 | 2 | 2 | 2 | 2 | 2 |
| Carbon black | 55 | 50 | 55 | 50 | 40 | 40 |
| Oil | 5 | 25 | 5 | 25 | 10 | 10 |
| Vulcanization promoting agent | 2 | 2 | 2 | 2 | 2 | 2 |

Test pieces according to Comparative Samples 8, 9 and 10 were prepared by using only the rubber materials A which are respectively used in Samples 18 and 19 of the invention and Comparative Sample 11 and which serve as the matrix phase ("sea" phase). Namely, these test pieces do not include the rubber material B dispersed in the rubber material A according to the present invention. The test pieces according to Comparative Samples 8, 9 and 10 include additives as also indicated in TABLE 15. The mixtures of the rubber material A and the additives were subjected to a press-vulcanizing and -molding process at 160° C. for 20 minutes, to obtain the test pieces. It will be understood from TABLE 15 that Comparative Sample 8 is similar to a vulcanized rubber member of Sample 18 except that the rubber material B in the form of Cl-IIR is not dispersed in the rubber material A in the form of the NR. In the same sense, Comparative Sample 9 corresponds to Sample 19 of the invention, while Comparative Sample 10 corresponds to Comparative Sample 11.

The test pieces according to Samples 18 and 19 of the invention and Comparative Samples 8–11 were subjected to the dynamic characteristics test, hardness test and tensile test, in the same manner as in Example 1. The results of the tests are indicated in TABLE 16.

Figure 3:
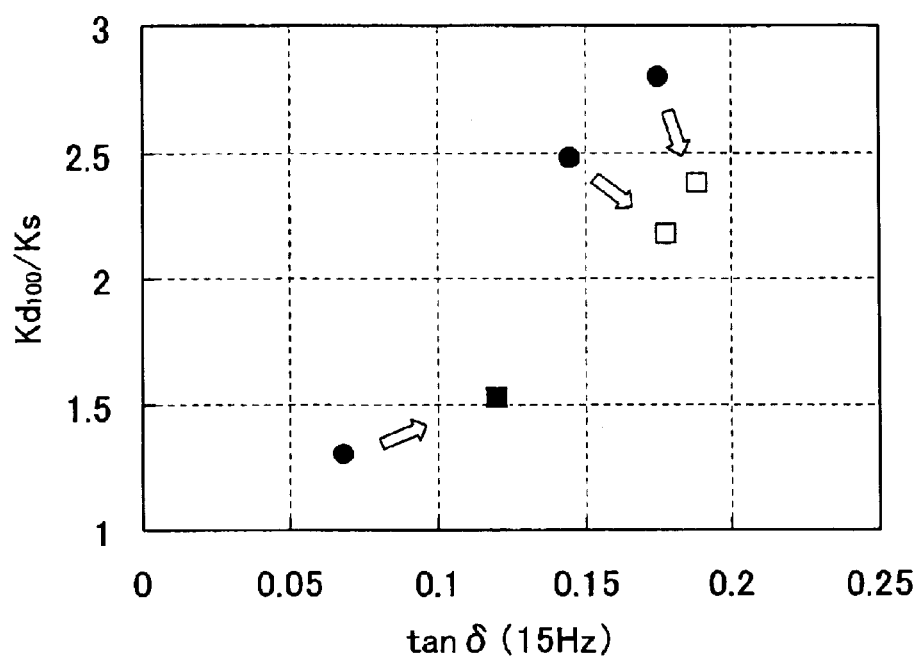
FIG. 3 is a graph indicating a relationship between the dynamic/static ratio of spring constant and the loss factor tan δ, which relationship was obtained in Example 3.

Relationships between the dynamic/static ratio ($Kd_{100}$/Ks) of spring constant and the loss factor tan δ [15 Hz] of the test pieces are indicated in the graph of FIG. 3, wherein "□" represents the test pieces according to Samples 18 and 19 of the present invention which have the "island-sea" structure, while "■" represents the test piece according to Comparative Sample 8 which has the "island-sea" structure but the matrix phase of which does not permit damping rubber characteristics as required by the present invention, while "●" represents the test pieces according to Samples 18 and 19 of the invention and Comparative Sample 11 which do not include any amount of the rubber material B that gives the "islands" phase.

TABLE 16

|  | Samples of the Invention | | Comparative Samples | | | |
| --- | --- | --- | --- | --- | --- | --- |
|  | 18 | 19 | 8 | 9 | 10 | 11 |
| Dynamic Characteristics Test | | | | | | |
| Dynamic/static ratio (Kd100/Ks) | 2.38 | 2.18 | 2.80 | 2.48 | 1.30 | 1.53 |
| Loss factor tan δ[15 Hz] | 0.189 | 0.178 | 0.175 | 0.145 | 0.068 | 0.120 |
| Physical Properties | | | | | | |
| JIS-A hardness | A65 | A51 | A65 | A50 | A50 | A51 |
| Tensile strength Tb (Mpa) | 20 | 15 | 26 | 21 | 25 | 19 |
| Breaking elongation Eb (%) | 480 | 530 | 580 | 680 | 600 | 540 |

It will be apparent from the results of the dynamic characteristics test indicated in TABLE 16 and FIG. 3 that the test piece according to Comparative Sample 11 which uses Cl-IIR as the rubber material of functional group-vulcanization type to give an "island-sea" structure to the vulcanized rubber member of Comparative Sample 10 whose rubber characteristics do not meet the requirements of the present invention (i.e., tan δ=0.068<0.1) has a higher degree of vibration damping effect (i.e., higher loss factor tan δ) than the test piece according to Comparative Sample 10, but has a relatively high dynamic/static ratio of spring constant. Thus, it will be understood that the test piece spring constant. Thus, it will be understood that the test piece according to Comparative Sample 11 does not solve the prior art problem that an increase in the vibration damping effect will cause an increase in the dynamic/static ratio of spring constant.

It will also be understood that unlike the test piece according to Comparative Sample 11, the test pieces according to Samples 18 and 19 of the present invention has a significantly increased loss factor tan δ and an effectively reduced dynamic/static ratio of spring constant, as compared with the test pieces according to Comparative Samples 8 and 9 the rubber material of which consists solely of the rubber material A. Namely, Samples 18 and 19 of the invention permit both a further improvement in the vibration damping effect with respect to low-frequency input vibrations, and a low dynamic/static ratio of spring constant (a low degree of dynamic spring stiffness) with respect to high-frequency input vibrations.

It will also be understood from the results of the hardness and tensile tests indicated in TABLE 16 that Samples 18 and 19 of this invention assure the JIS-A hardness of at least A50, and are satisfactory in the other physical properties such as the tensile strength (Tb) and breaking elongation (Eb).

INDUSTRIAL APPLICABILITY

It will be understood from the foregoing description that the vibration damping rubber member according to the present invention is capable of exhibiting both a low degree of dynamic spring stiffness and a high vibration damping effect, and can be suitably used as vibration damping rubber members for automotive vehicles, such as an engine mount, and various other vibration damping structures which are required to different vibration damping characteristics depending upon different kinds of input vibrations having different frequencies. The process of producing the vibration damping rubber member according to this invention permits economical and easy manufacture of vibration damping rubber members having excellent damping characteristics.

The process of the invention permits the produced vibration damping rubber member to exhibit a significantly reduced dynamic/static ratio of spring constant while maintaining a high vibration damping effect, as well as assure various physical properties required by the vibration damping rubber member. Thus, the present process has made it possible to produce a vibration damping rubber member capable of exhibiting a high vibration damping effect and a low degree of dynamic spring constant.

What is claimed is:

1. A process of producing a vibration damping rubber member, characterized by: evenly mixing together an unvulcanized rubber material A which enables the vibration damping rubber member to exhibit a low degree of dynamic spring stiffness, an unvulcanized rubber material B which enables the vibration damping rubber member to have a high vibration damping effect, and a vulcanizing agent capable of vulcanizing only said unvulcanized rubber material B; heating a mixture of said unvulcanized rubber materials A and B and said vulcanizing agent, to vulcanize said unvulcanized rubber material B such that fine particles of the vulcanized rubber material B, having an average size of 0.1 to 100 μm, are dispersed in said unvulcanized rubber material A; adding to said mixture a vulcanizing agent capable of vulcanizing said unvulcanized rubber material A; and forming a thus obtained mixture into a desired shape, and heating the formed mixture to vulcanize said unvulcanized rubber material A, for obtaining said vibration damping rubber member having an island-sea structure in which fine particles of the vulcanized rubber material B are dispersed as a dispersed phase in a matrix phase of the vulcanized rubber material A.

2. A process according to claim 1, wherein said unvulcanized rubber material A is evenly mixed with the unvulcanized rubber material B to which said vulcanizing agent capable of vulcanizing only said unvulcanized rubber material B has been mixed with said unvulcanized rubber material.

3. A process according to claim 2, wherein said unvulcanized rubber material A is vulcanized by a sulfur-based vulcanizing system, while said unvulcanized rubber material B is vulcanized by a resin-based vulcanizing system, a metal-oxide-based vulcanizing system or an amine-based vulcanizing system.

4. A process according to claim 1, wherein said unvulcanized rubber material A is vulcanized by a sulfur-based vulcanizing system, while said unvulcanized rubber material B is vulcanized by a resin-based vulcanizing system, a metal-oxide-based vulcanizing system or an amine-based vulcanizing system.

5. A process according to claim 1, wherein said rubber material A comprises NR or a mixture of NR and SBR, and said rubber material B comprises maleicacid-modified EPM, CSM, CPE, FR or acrylic rubber.

6. A process according to claim 1, wherein said rubber material A comprises a mixture of NR and BR, and said rubber material B comprises halogenated I I R, maleicacid-modified EPM, CR, carboxyl-modified NBR, CSM, CPE, FR or acrylic rubber.

7. A process according to claim 1, wherein said rubber material A comprises NR and said rubber material B comprises halogenated I I R.

* * * * *